(12) United States Patent
Campinos et al.

(10) Patent No.: US 6,532,539 B1
(45) Date of Patent: Mar. 11, 2003

(54) PROCESS FOR CONTROLLING ACCESS TO A DOMESTIC NETWORK AND DEVICE IMPLEMENTING THE PROCESS

(75) Inventors: Arnaldo Campinos, Paris (FR); Dominique Guillet, Rennes (FR)

(73) Assignee: Thomson Licensing S.A., Boulogne Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,827

(22) Filed: Oct. 13, 1998

(30) Foreign Application Priority Data

Oct. 14, 1997 (FR) .............................. 97 12837

(51) Int. Cl.[7] .............................. H04L 9/00; H04N 7/167
(52) U.S. Cl. ........................ 713/150; 380/255; 380/210
(58) Field of Search ................................ 380/23, 24, 4, 380/255, 239, 240, 241, 210; 705/75; 713/168, 169, 170, 150

(56) References Cited

U.S. PATENT DOCUMENTS

| 5,420,866 A | | 5/1995 | Wasilewski | |
|---|---|---|---|---|
| 5,461,675 A | * | 10/1995 | Diehl et al. | 380/23 |
| 5,521,979 A | * | 5/1996 | Deiss | 380/20 |
| 5,539,822 A | * | 7/1996 | Lett | 380/20 |
| 5,557,518 A | * | 9/1996 | Rosen | 364/408 |
| 5,666,412 A | * | 9/1997 | Handelman et al. | 380/4 |
| 5,870,476 A | * | 2/1999 | Fischer | 380/24 |
| 6,023,762 A | * | 2/2000 | Dean et al. | 713/193 |

FOREIGN PATENT DOCUMENTS

EP 0679029 10/1995 ............ H04N/7/16

OTHER PUBLICATIONS

"Functional model of a conditional access system," EBU Review Technical (1995) Winter, No. 266, Grand–Saconnex, CH, pp 64–77.

French search report dated Jun. 11, 1998.

* cited by examiner

*Primary Examiner*—Matthew Smithers
(74) *Attorney, Agent, or Firm*—J. S. Tripoli; R. D. Shedd; D. T. Shoneman

(57) ABSTRACT

The present invention relates to a process making it possible to control access to at least one terminal with address AD by at least one scrambled item with the aid of at least one control word. The process comprises a step making it possible to construct a descrambling item in the form of a message containing the control word, a datum making it possible to identify the scrambled item and the address of the terminal.

6 Claims, 3 Drawing Sheets

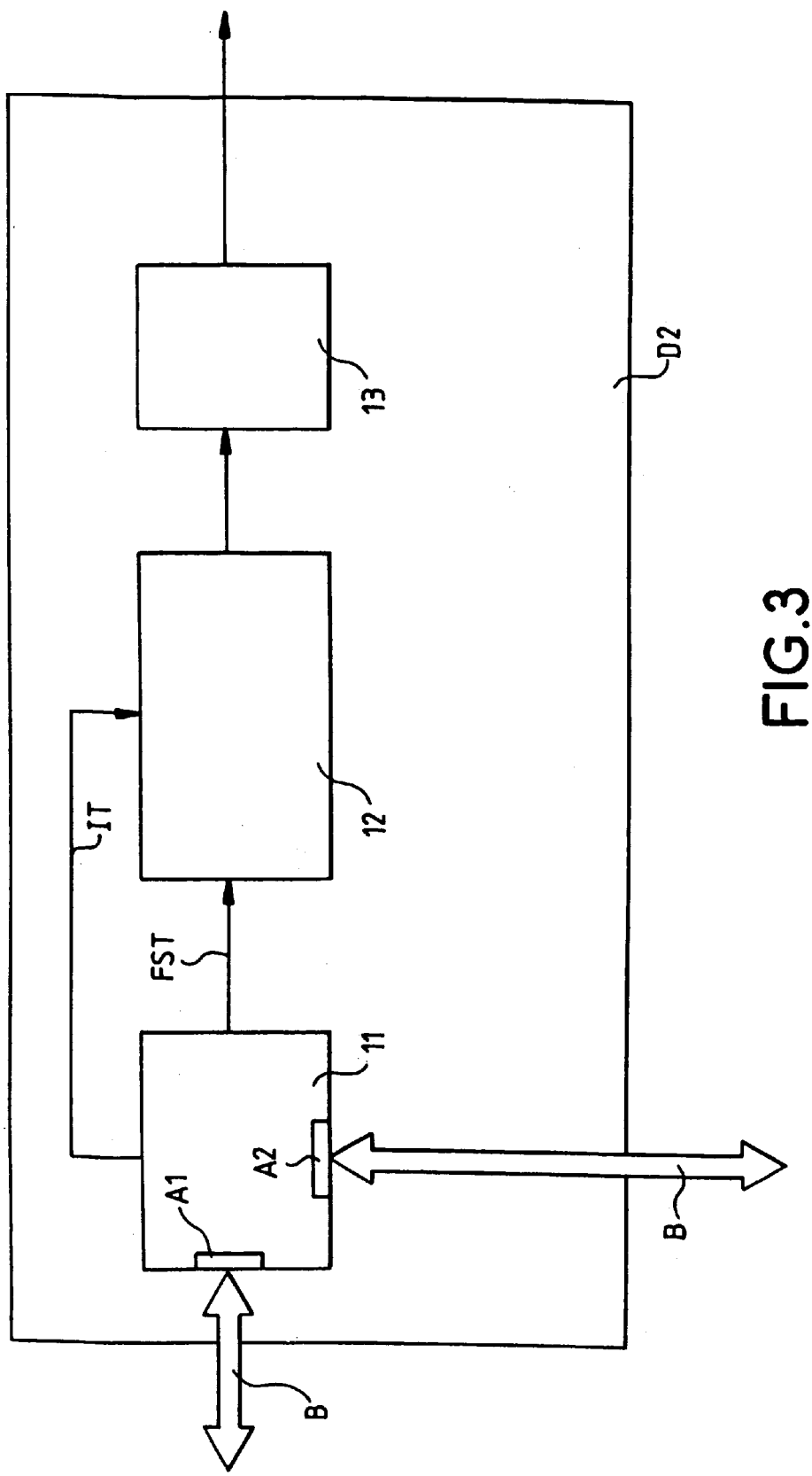

PROCESS FOR CONTROLLING ACCESS TO A DOMESTIC NETWORK AND DEVICE IMPLEMENTING THE PROCESS

FIELD OF THE INVENTION

The present invention relates to a conditional access system and, more particularly, to a conditional access system for a domestic network.

BACKGROUND OF THE INVENTION

A conditional access system allows a service provider to supply his services solely to users having acquired entitlements to these services. Such is the case, for example, in paid television systems.

As is known to a person skilled in the art, the service supplied by a service provider consists of an item of information scrambled by control words. The scrambled item can be descrambled, and therefore read by the user, only with regard to the entitlements allocated to this user.

To descramble the item, the service provider supplies each user with the control words which served for scrambling the item. To keep the control words secret, they are supplied after having been encrypted with an algorithm with key K. The various encrypted control words are sent to the various users in control messages which will be denoted ECM hereinafter (ECM standing for "Entitlement Control Message").

According to the prior art, an ECM consists of a header and a payload.

The header gives, inter alia, the type and size of the items contained in the payload of the ECM. The payload consists, inter alia, of an item containing the set of conditions for access to the service supplied by the provider, an item containing at least one control word encrypted with the algorithm with key K and an item containing a datum depending on the key K and making it possible to validate and verify the content of the ECM and, more particularly, access conditions contained in the ECM.

So as to accord access to its service solely to authorized users, the service provider supplies a smart card and a decoder to each of the users.

The smart card makes it possible, on the one hand, to validate and record the entitlements which the user has to the service delivered and, on the other hand, to decrypt, with the aid of the key K, the encrypted control words. For this purpose, the smart card contains the key K of the algorithm which allowed the encryption of the control words.

The decoder, for its part, makes it possible to descramble the scrambled item on the basis of the item consisting of the encrypted control words from the smart card.

The entitlements of each user are sent in messages for managing the user's entitlements which will subsequently be denoted EMM (the abbreviation EMM standing for "Entitlement Management Message").

According to the prior art, a message EMM consists of a header and a payload. The payload of the EMM contains three main items:

a first item giving the address of the user's card;

a second item giving the description of the user's entitlements;

a third item making it possible to validate the EMM and to verify that the user's entitlements contained in the EMM are indeed the entitlements reserved for the user.

As mentioned previously, the encrypted control words are sent to the users by way of the ECMs.

When the decoder of a user recognizes the address of the card associated therewith among the various addresses distributed by the service provider, the EMM corresponding to the recognized address is analysed. The analysis of the EMM is performed with the aid of an analysis algorithm controlled by the encryption key K of the control words.

If the analysis of the message EMM leads to the validation of the latter, the user's entitlements are then stored in a memory.

The user card also comprises a circuit for validating the ECMs, an access control circuit and also a circuit for decrypting the encrypted control words.

The circuit for validating ECMs makes it possible to validate the access conditions. The access control circuit compares the validated access conditions with the user's validated entitlements. If the validated access conditions correspond to the user's validated entitlements, decryption is authorized. In the contrary case, decryption is not authorized.

A domestic network consists of a set of domestic terminals linked together by a domestic bus such as, for example, the IEEE 1394 bus.

The term domestic terminal should be understood to mean, by way of non-limiting examples, a receiver of television programmes, a digital decoder, a digital camcorder, a reader of digital discs commonly referred to as DVDs (the abbreviation DVD standing for "Digital Versatile Disc"), or else a terminal commonly referred to as a PC (the abbreviation PC standing for "Personal Computer")

Within the framework of a conditional access system such as the one according to the prior art mentioned above, when a service provider subscriber desires, for example, to be able to receive the same programme on all the television receivers which form part of his domestic network, he is then obliged to take out as many subscriptions as he has television receivers. From the user's point of view, this presents a major drawback in terms of costs.

From the service provider's point of view, this also presents a major drawback. This is because it is impossible for the service provider to make his services selective with regard to the total stock of programme receivers and, more generally of domestic terminals, which the subscriber possesses.

The invention does not have these drawbacks.

SUMMARY OF THE INVENTION

The invention relates to a process making it possible to control access to at least one terminal with address AD by at least one scrambled item with the aid of at least one control word, the scrambled item being contained in a data stream comprising a first datum making it possible to identify the scrambled item, a second datum describing the entitlements possessed by a user with regard to the scrambled item, a third datum containing the control word encrypted with an algorithm with key K, the process comprising at least one step making it possible to decrypt the encrypted control word. The process comprises a step making it possible to construct at least one descrambling item containing the decrypted control word, the first datum and the address AD of the terminal.

The invention also relates to a device making it possible to control access to at least one terminal with address AD by at least one scrambled item with the aid of at least one control word, the scrambled item being contained in a data stream comprising a first datum making it possible to identify the scrambled item, a second datum describing the entitlements possessed by a user with regard to the scrambled item, a third datum containing the control word encrypted with an algorithm with key K. The device comprises means making it possible to construct a descrambling item containing the decrypted control word, the first datum and the address AD of the terminal.

The invention also relates to a decoder making it possible to descramble at least one scrambled item which it receives. The decoder comprises at least one device such as the abovementioned device according to the invention.

The invention further relates to a process for descrambling, by a device associated with a terminal with address AD, at least one scrambled item with the aid of at least one control word. The process comprises:

a step of receiving at least one descrambling item containing the control word, a datum making it possible to identify the scrambled item and an address making it possible to identify a terminal, a step allowing the device associated with the terminal with address AD to recognize or not recognize, from among the addresses contained in the descrambling items received, the address AD, so that if the address AD is recognized the descrambling is authorized and if the address AD is not recognized, the descrambling is not authorized.

The invention further relates to a descrambling device associated with a terminal with address AD and which makes it possible to descramble at least one scrambled item with the aid of at least one control word. The descrambling device comprises means for receiving a descrambling item containing the control word, a datum making it possible to identify the scrambled item and an address making it possible to identify a terminal and for recognizing or not recognizing, from among the addresses contained in the descrambling items received, the address AD so that, if the address AD is recognized, the descrambling is authorized and, if the address AD is not recognized, the descrambling is not authorized.

The invention will be more particularly described in the case in which conditional access relates to a network of domestic terminals linked together by a bus. More generally, however, the invention also relates to the case in which conditional access relates to at least one user terminal configured as a network or otherwise.

The invention advantageously enables a service provider to make his services selective with regard to a set of networked domestic terminals.

BRIEF DESCRIPTION OF THE DRAWINGS

Other characteristics and advantages of the invention will emerge on reading a preferred embodiment of the invention, with reference to the appended figures in which:

FIG. 3 represents a device for descrambling at least one scrambled programme selected with the aid of a device for a conditional access system such as the one represented in FIG. 1.

In all the figures, the same references denote the same elements.

DETAILED DESCRIPTION

Figure 1:
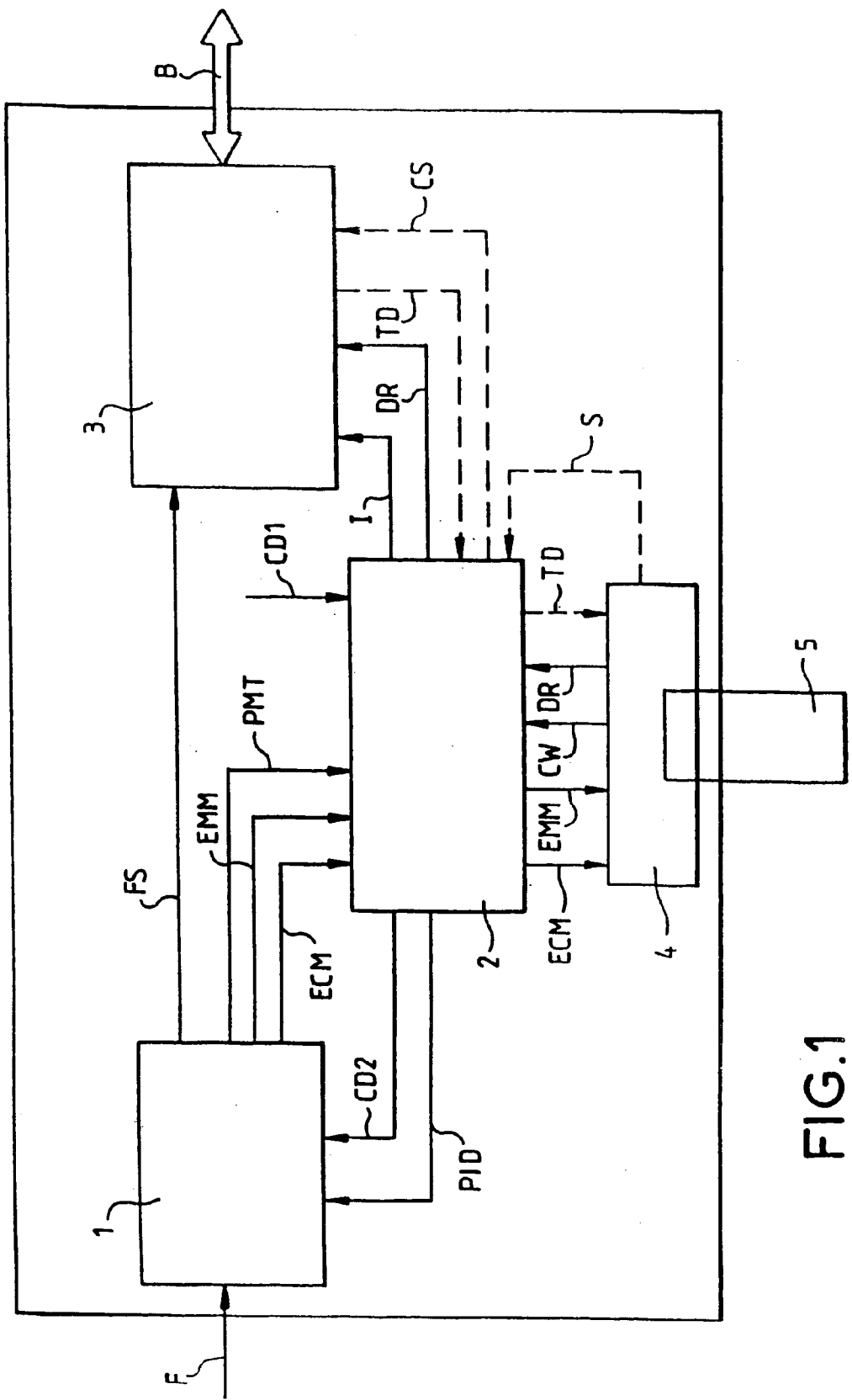
FIG. 1 represents a device for a conditional access system containing means making it possible to control access by at least one programme on at least one domestic terminal according to the invention.

FIG. 1 represents a device for a conditional access system containing means making it possible to control access by at least one programme on at least one domestic terminal according to the invention.

The device D1 for a conditional access system comprises a demultiplexing circuit 1, a circuit 3 for interfacing with the domestic bus B, a microprocessor 2 and a circuit 4 for interfacing between the microprocessor 2 and the smart card 5.

The demultiplexing circuit 1 receives on its input the data stream F corresponding to all the programmes distributed by the service provider. Preferably, the stream F emanates from an analogue/digital conversion circuit (not represented in FIG. 1) commonly referred to as a "front end".

As is known to the person skilled in the art, in the case of a transport of data in the MPEG-2 format, the stream F comprises a succession of packets of video data, of packets of audio data and of packets of management data such as, for example, the data contained in the ECMs and the EMMs.

In its header, each packet of data comprises an identifier which will subsequently be denoted PID (the abbreviation PID standing for "Packet IDentifier"), making it possible to identify both the nature of the data contained in the packet (video, audio or management) and the programme to which this packet belongs.

Each programme delivered by the service provider consists of a set of programme components, each programme component consisting of a set of packets whose PIDs are identical.

The stream F also contains an item which will subsequently be referred to as a PMT table (the abbreviation PMT; standing for "Programme Map Table") and which gathers together the PIDs corresponding to the set of programmes distributed by the service provider.

According to the invention, under the action of a command CD1, the microprocessor 2 generates a command CD2 which is applied to the demultiplexer 1. The command CD1 is a user command emanating, in a manner known per se, from the interaction of a user with a domestic terminal. The command CD1 can be conveyed to the microprocessor 2 in various ways. According to a first embodiment, the command CD1 can be conveyed from the domestic terminal concerned to the microprocessor 2 by way of the domestic bus B. According to another embodiment, the command CD1 can be applied to a control interface, not depicted in FIG. 1, and which may or may not be part of the device D1. The command CD1 contains an address datum AD for the domestic terminal on which the user wishes to receive the programme which he selects. On receipt of the command CD1, the address datum AD is stored in the microprocessor 2.

The PMT table corresponding to the programme selected is extracted from the stream F in a manner known per se and is forwarded to the microprocessor 2. The microprocessor 2 processes the item constituted by the PMT table and extracts therefrom the PIDs of the selected programme. The PIDs extracted are then forwarded from the microprocessor 2 to the demultiplexer 1. Under the action of the PIDs, the demultiplexer 1 selects the stream of scrambled data FS which corresponds to the selected programme, the various messages ECM which contain the control words making it possible to descramble the selected programme, as well as the messages EMM which contain the user's entitlements with regard to the services supplied by the provider.

The stream FS is forwarded from the demultiplexer 1 to the interface circuit 3 and the messages ECM and EMM are forwarded from the demultiplexer 1 to the smart card 5, via the microprocessor 2 and the interface circuit 4.

As is known to the person skilled in the art, the smart card 5 contains five main circuits (not represented in FIG. 1);
- a circuit for validating the user's entitlements;
- a circuit for storing the user's validated entitlements;
- an access control circuit;
- a circuit for validating the messages ECM;
- a circuit for decrypting the encrypted control words.

As mentioned earlier, the validation circuit makes it possible to perform, on the messages EMM, the operations for recognizing the address of the user and for analysing the user's entitlements. To this end, the validation circuit contains the key K of the algorithm for encrypting the control words. If the message EMM is validated, the user's entitlements contained in the message EMM are stored in the circuit for storing the validated entitlements.

According to the invention, in the case in which the domestic terminals are networked, the user's validated entitlements are divided, preferably, into two categories:
- a first category of entitlements relates to the intrinsic entitlements which a user possesses with regard to at least one programme distributed by the service provider,
- a second category of entitlements relates to the re-distribution entitlements which the service provider grants to a user within the user's domestic network.

By way of non-limiting example, the re-distribution entitlement which a service provider grants to a user within his domestic network may take the form of the number of different terminals on which the service provider authorizes the user to receive a programme. It may also be a maximum number of different programmes for which the service provider authorizes unenciphered reception, whatever these programmes may be.

As mentioned earlier, the circuit for validating the ECMs makes it possible to validate the access conditions contained in the ECMs. To this end, the circuit for validating the ECMs contains the key K of the algorithm for encrypting the control words.

Thus, the access control circuit compares the validated access conditions with the user's validated entitlements relating to the first category of entitlements mentioned above.

If the validated access conditions correspond to the user's validated entitlements, decryption of the control words is authorized. In the contrary case, decryption is not authorized.

In the case in which decryption of the encrypted control words is authorized, the decrypted control words CW are forwarded, via the interface circuit 4, from the smart card 5 to the microprocessor 2.

Each decrypted control word CW makes it possible to descramble the scrambled item constituted by a programme component. As mentioned earlier, each programme component consists of a set of packets whose PIDs are identical. It follows that to each control word CW there corresponds a PID which will subsequently be denoted PID(CW) and which makes it possible to identify the scrambled item.

According to the invention, the microprocessor 2 constructs, for each decrypted control word, a descrambling item I containing the decrypted control word CW, the datum PID(CW) which makes it possible to identify the programme component to be descrambled and the address datum AD of the domestic terminal from which the command for access to the selected programme emanates.

As is known to the person skilled in the art, there are cases for which a single message ECM contains two control words. A first control word is one which makes it possible to descramble the component of the programme currently being read and a second control word one which makes it possible to descramble the component of the programme which follows the component of the programme currently being read. According to the invention, preferably, in cases such as those mentioned above, the item I contains an additional datum making it possible to indicate whether the decrypted control word which it contains is of the first type or of the second type.

In a manner known per se, the item I also comprises a header H making it possible to define, inter alia, the type and size of the data which it contains.

The interface circuit 3 receives the stream FS output by the demultiplexer 1 as well as the item I output by the microprocessor 2.

According to a first embodiment of the invention, the re-distribution entitlements DR for the programmes which are stored in the smart card 5 are transferred, via the interface 4 and the microprocessor 2, to a memory circuit situated, for example, in the interface circuit 3. This copying of the entitlements DR into a memory circuit can be performed once and for all, but it can also advantageously be performed whenever these entitlements are modified.

If the re-distribution entitlements DR for the programmes supplied by the service provider so authorize, the request for a programme whose descrambling is itself authorized takes the form of the forwarding to the domestic terminal from which the request emanates, via the domestic bus B, of the selected stream FS and of the various items I containing the address of the domestic terminal. Authorization to distribute the programme within the domestic network is controlled by a signal arising from the comparison between the entitlements DR and the various commands originating, via the bus B, from domestic terminals. The comparator circuit which performs the said comparison can, for example, be included within the interface circuit 3.

According to a second embodiment of the invention, the entitlements DR are not transferred to a memory circuit as mentioned above. It is the various commands TD originating from the domestic terminals which are transferred, via the microprocessor 2 and the interface 4, to a memory area of the smart card 5. The comparison of the entitlements DR and of the commands TD originating from the domestic terminals is then performed by a comparison circuit such as, for example, the access control circuit situated in the smart card 5. A signal S arising from the comparison between the entitlements DR and the commands TD is transferred, via the interface circuit 4, from the smart card 5 to the microprocessor 2 which then generates a command CS making it possible to authorize or not authorize, in whole or part, the programme requests originating from the domestic terminals.

According to the invention, the item I allowing the descrambling of a programme is not part of the stream FS in the MPEG-2 format. The item I travels via the asynchronous link of the domestic bus B and is forwarded only to the terminal from which the programme request emanates. The stream FS preferably travels via the isochronous link of the bus B. Advantageously, according to the invention, it is then unnecessary for the control words which travel around the domestic network to be encrypted.

According to the invention, the decrypted control words which travel around the domestic network are no longer synchronized with the data which they have to decrypt in the same way as in the prior art. Advantageously, it is however unnecessary to devise specific signals to ensure the synchronization of a control word and of the programme component which this control word is to descramble. Given the bit rates allowed for by the asynchronous channel of the bus B (in the example of the IEEE 1394 bus, this bit rate is of the order of 4 Mbytes/s), this synchronization is ensured without difficulty.

According to the invention, a device for a conditional access system such as the one represented in FIG. 1 can be associated, within the same decoder, with various circuits allowing the local descrambling of scrambled data. The term local descrambling of scrambled data should be understood to mean a descrambling of data in the decoder itself. Such a decoder then comprises, in a manner known per se, a descrambler circuit, a demultiplexer circuit and a video and audio decoder in the MPEG-2 format. The locally descrambled data are preferably descrambled in the same way as described earlier according to the prior art.

As mentioned earlier, preferably, a decoder such as that described above can also comprise, on its input, an analogue/digital converter commonly referred to as a "front end".

Figure 2:
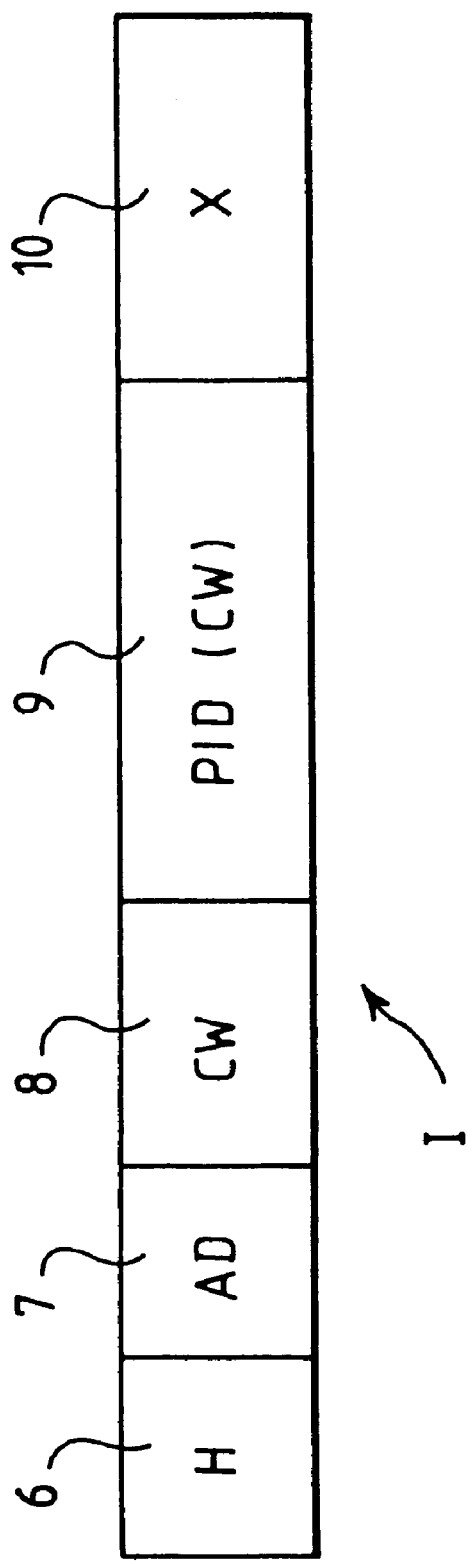
FIG. 2 represents, according to the invention, a descrambling item making it possible to descramble a scrambled item.

FIG. 2 represents, according to the invention, a descrambling item making it possible to descramble a scrambled item.

The item represented in FIG. 2 is the item I mentioned above.

The item I constitutes a message containing a header 6 whose contents H make it possible to define, inter alia, the type and size of the data contained in the message, a datum 7 containing the address AD of a domestic terminal having sent a request for access to a programme, a datum 8 containing a decrypted control word CW intended to descramble a programme component, a datum 9 containing the datum PID(CW) and, according to a particular embodiment of the invention, a datum 10 containing an item X making it possible to indicate whether the control word CW is a control word of the first type or of the second type. According to other embodiments of the invention, the item I does not contain the datum 10.

FIG. 3 represents a device for descrambling at least one scrambled programme selected with the aid of a device for a conditional access system such as the one represented in FIG. 1. According to the invention, a device such as that represented in FIG. 3 is associated with a domestic terminal.

The descrambling device D2 comprises an interface circuit 11, a descrambling and demultiplexing circuit 12 and a video and audio decoder 13.

The interface circuit 11 is linked by at least two access ports to the domestic bus B. By way of a first access port A1, the interface circuit 11 receives, in a manner known per se, the data stream selected by the domestic terminal with which it is associated as well as the data stream or streams selected by the domestic terminal or terminals situated upstream of the domestic terminal with which it is associated. According to the invention, the circuit 11 also receives, via the first access port A1, the various descrambling items I which correspond to the set of programmes selected.

In the case in which the interface circuit 11 recognizes, from among the descrambling items I which it receives, the items IT containing the address of the domestic terminal with which it is associated, it selects them and forwards them to the circuit 12. The items IT contain the whole of the item necessary for parametrizing the descrambling circuit 12(CW, PID(CW)), X).

The data stream FST which corresponds to the items IT recognized is forwarded to the descrambling and demultiplexing circuit 12. Under the action of the control words CW, the scrambled data of the stream FST are descrambled. In a manner known per se, the descrambled data are demultiplexed so as to reconstruct video and audio data in the MPEG-2 format. The video and audio data in the MPEG-2 format are then forwarded from the circuit 12 to the video and audio decoder 13. The data output by the video and audio decoder 13 are then forwarded to the domestic terminal with which the device D2 is associated.

In the case in which the interface circuit 11 receives a scrambled data stream selected by a domestic terminal situated upstream of the domestic terminal with which it is associated, this data stream as well as the messages of type I containing the control words for descrambling it are steered towards the second access port A2 and forwarded over the domestic network.

By way of the domestic bus B linked to the access port A2, the stream of scrambled data as well as the messages of type I containing the control words for descrambling the data stream are then forwarded to the descrambling device associated with the domestic terminal from which the programme request emanates.

According to the invention, access control is carried out in its entirety by the device D1. Each descrambling device associated with a domestic terminal is thus independent of the access control system to which it is linked. Advantageously, it follows that the domestic network is compatible with numerous different conditional access systems.

As mentioned earlier, the control words which travel around the domestic network are control words arising from an operation for decrypting the encrypted control words supplied by a service provider. Thus, according to the preferred embodiment of the invention, the control words which travel around the domestic network are unenciphered control words.

However, the invention also relates to the case in which the control words which travel around the domestic network are encrypted control words. The encryption of the control words is then an encryption performed at the level of the domestic network itself by an encryption device situated, preferably, at the head of the network. Encryption of the control words which travel around the domestic network finds a particular advantage in cases in which the user of the domestic network desires to increase the level of protection of the items which travel around the network. In the case in which the control words which travel around the domestic network are encrypted, each descrambling device comprises a circuit making it possible to decrypt them before the descrambling operation is performed.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the append claims.

What is claimed is:

1. A method for managing access to a scrambled program received by a first device connected to a network, the method comprising the steps of:

(a) receiving, in said first device, said scrambled program comprising:
 a data component scrambled using a control word;
 said encrypted control word; and
 an identifier of the scrambled data component;

(b) decrypting, in said first device, the encrypted control word to generate a decrypted control word;

(c) transmitting said scrambled data component to a second device connected to said network;

(d) generating a data item comprising said decrypted control word, said identifier of the scrambled data component and the address of said second device; and (e) transmitting said data item to said second device.

2. The method according to claim 1 wherein step (c) comprises:

transmitting said scrambled data component to said second device using the isochronous channel of a bus interconnecting said first and said second device.

3. The method according to claim 2 wherein step (e) comprises:

transmitting said data item to said second device using the asynchronous channel of said bus.

4. A method for managing access to a scrambled program received by a first device connected to a network, the method comprising the steps of:

(a) receiving, in said first device, said scrambled program comprising:
a data component scrambled using a control word;
said encrypted control word;
an identifier of the scrambled data component; and
user's entitlements with regard to said scrambled program, said entitlements containing re-distribution entitlements relating to the distributing of said scrambled program within the network, (b) decrypting, in said first device, the encrypted control word to generate a decrypted control word;

(c) storing, in said first device, said re-distribution entitlements;

(d) receiving from a second device connected to said network a command containing the address of said second device;

(e) comparing said command with said stored re-distribution entitlements to authorize or not authorize the transfer to said second device of the scrambled data component and the decrypted control word.

5. A method for managing access to a scrambled program within a network comprising:

(a) receiving, in a first terminal connected to said network:
a data component scrambled using a control word; and
a data item containing a decrypted control word, an identifier of the scrambled data component and the address of a terminal connected to said network;

(b) comparing the address contained in said data item with the address of said first terminal and,
if said addresses match, authorizing said first terminal to descramble the scrambled data component using the decrypted control word contained in said data item.

6. A method for managing conditional access within a network comprising the steps of:

(a) receiving from a service provider in a device coupled to said network:
a service scrambled using a control word and
said control word encrypted using a first key, said first key being associated with said service provider;

(b) decrypting in said device said encrypted control word using said first key;

(c) re-encrypting in said device said decrypted control words using a second key, said second key being associated with said network; and (d) transferring said scrambled service and said re-encrypted control word to a terminal coupled to said network.

* * * * *